(12) United States Patent
Gittins et al.

(10) Patent No.: US 10,308,251 B2
(45) Date of Patent: Jun. 4, 2019

(54) TRANSMISSION ENGAGEMENT CONTROL SYSTEM

(71) Applicant: Ford Global Technologies, LLC, Dearborn, MI (US)

(72) Inventors: Scott Joseph Gittins, Ann Arbor, MI (US); Ryan Eggebrecht, Merrill, MI (US); Timothy Fedullo, Northville, MI (US); Samuel Glauber, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 15/676,297

(22) Filed: Aug. 14, 2017

(65) Prior Publication Data

US 2019/0047568 A1 Feb. 14, 2019

(51) Int. Cl.

| | |
|---|---|
| *B60W 10/115* | (2012.01) |
| *B60W 30/18* | (2012.01) |
| *F16H 61/12* | (2010.01) |
| *F16H 63/34* | (2006.01) |
| *B60W 10/196* | (2012.01) |

(Continued)

(52) U.S. Cl.
CPC .... *B60W 30/18054* (2013.01); *B60W 10/115* (2013.01); *B60W 10/196* (2013.01); *B60W 30/19* (2013.01); *F16H 61/0021* (2013.01); *F16H 61/12* (2013.01); *F16H 63/3425* (2013.01); *F16H 63/3483* (2013.01); *B60W 2510/108* (2013.01); *B60W 2510/188* (2013.01); *B60W 2540/12* (2013.01); *B60W 2540/16* (2013.01); *B60W 2710/1083* (2013.01); *B60W 2710/188* (2013.01); *F16H 3/666* (2013.01); *F16H 2061/1276* (2013.01); *F16H 2200/201* (2013.01); *F16H 2200/2046* (2013.01); *F16H 2200/2069* (2013.01);

(Continued)

(58) Field of Classification Search
CPC ......... Y10T 477/69395; Y10T 477/648; F16H 61/0021; F16H 63/3483; F16H 63/3425; F16H 61/12; B60W 30/18054; B60W 30/19; B60W 10/196; B60W 10/115; B60W 2540/12; B60W 2710/188; B60W 2710/1083; B60W 2540/16; B60W 2510/188
See application file for complete search history.

(56) References Cited

U.S. PATENT DOCUMENTS

| | | |
|---|---|---|
| 4,611,507 A | 9/1986 | Burkel et al. |
| 4,972,738 A | 11/1990 | Narita |

(Continued)

*Primary Examiner* — Roger L Pang
(74) *Attorney, Agent, or Firm* — David Kelley; Brooks Kushman P.C.

(57) ABSTRACT

A transmission park mechanism is hydraulically actuated. Specifically a controller releases the parking pawl by commanding engagement of particular shift elements at an elevated line pressure. The process of transitioning from Park to a Drive or Reverse condition may involve several sequential steps. To reduce the delay between driver selection of Drive or Reverse and completion of the engagement, it is advantageous to raise the line pressure in response to depression of a brake pedal, prior to movement of the shift lever. To limit the adverse fuel economy impact of increased line pressure, the line pressure is lowered again if the driver does not move the shift lever soon after depressing the brake pedal.

18 Claims, 4 Drawing Sheets

(51) Int. Cl.
  *B60W 30/19* (2012.01)
  *F16H 61/00* (2006.01)
  *F16H 3/66* (2006.01)

(52) U.S. Cl.
  CPC ... *F16H 2200/2084* (2013.01); *Y10T 477/648* (2015.01); *Y10T 477/69395* (2015.01)

(56) References Cited

U.S. PATENT DOCUMENTS

| | | |
|---|---|---|
| 7,041,030 B2 | 5/2006 | Kuroda et al. |
| 8,157,705 B2 * | 4/2012 | Yu .................... B60K 6/485 477/183 |
| 9,067,599 B2 | 6/2015 | Maanen et al. |
| 9,168,913 B2 * | 10/2015 | Lee .................... B60W 10/06 |
| 9,366,336 B2 * | 6/2016 | Gooden ............ F16H 61/0006 |

* cited by examiner

TRANSMISSION ENGAGEMENT CONTROL SYSTEM

TECHNICAL FIELD

This disclosure relates to the field of control systems for automatic transmissions for motor vehicles. In particular, this disclosure relates to a control strategy to improve engagement of drive or reverse from a park condition.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

When a vehicle is parked, the transmission may engage a parking pawl which holds the transmission shaft stationary to prevent the vehicle from rolling. The parking system is designed to remain engaged without consuming any power during extended unattended periods. Normally, the parking pawl is engaged in response to the driver selecting Park and is disengaged in response to the driver selecting any other range, such as Reverse, Neutral, Drive, or Low. However, there are some conditions in which the transmission may over-ride the driver selection.

SUMMARY OF THE DISCLOSURE

A transmission includes a parking pawl, a hydraulic control system, a pump, and a controller. The parking pawl is engageable to hold an output shaft stationary. The hydraulic control system includes a line pressure circuit. The hydraulic system may also include a plurality of clutch apply circuits. To establish a drive ratio, the controller permits fluid flow from the line pressure circuit to a first subset of the clutch apply circuits. To release the parking pawl, the controller pressurizes a second subset of the clutch apply circuits. The pump supplies pressurized fluid to the line pressure circuit. The controller is configured to increase pressure in the line pressure circuit in response to depression of a brake pedal while the parking pawl is engaged to decrease the time required to engage a drive ratio. The controller may reduce the pressure in the line pressure circuit if the brake pedal is depressed for longer than a threshold time while a shifter remains in a park position or in response to release of the brake pedal.

A vehicle includes a parking mechanism, a transmission pump, and a controller. The parking mechanism selectively holds the vehicle stationary. The transmission pump supplies pressurized fluid to a line pressure circuit and selectively to a plurality of clutch apply circuits. To engage a drive ratio, the controller engages a first subset of shift elements by fluidly connecting corresponding clutch apply circuits to the line pressure circuit. To release the park mechanism, the controller engages a second subset of the shift elements by fluidly connecting corresponding clutch apply circuits to the line pressure circuit. The controller is programmed to increase pressure in the line pressure circuit in response to depression of a brake pedal while the parking mechanism is engaged to decrease the time required to engage a transmission drive ratio. The controller may reduce the pressure in the line pressure circuit if the brake pedal is held for longer than a threshold time or if the brake pedal is released.

A method of controlling a transmission includes controlling a pressure in a line pressure circuit to a first level with the transmission in Park and a brake pedal released and then, in response to depression of the brake pedal, increasing the pressure to a second level. If the brake pedal remains depressed for longer than a threshold time with the transmission in Park, the pressure may be decreased to the first level. In response to a shifter being moved from a Park position, a first shift element is engaged to release a parking pawl. Then, at least one shift element may be released which may include the first shift element. Then, a second shift element may be engaged to establish a power flow path from a transmission input shaft to a transmission output shaft.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
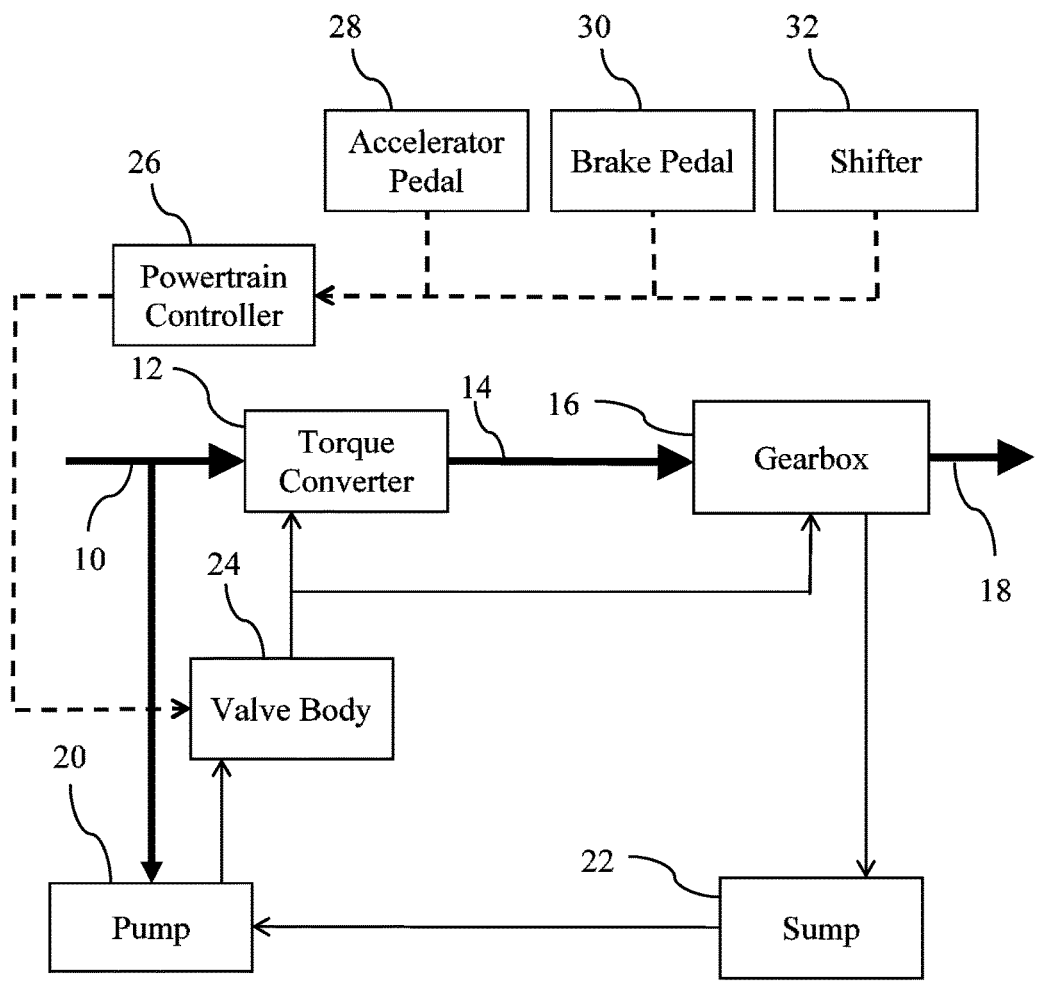
FIG. 1 is a schematic diagram of a transmission system.

FIG. 1 schematically illustrates a vehicle transmission. Bold solid lines represent mechanical power flow connections. Thin solid lines represent the flow of hydraulic fluid. Dashed lined represent the flow of information signals. Power is supplied at input shaft 10, generally from an internal combustion engine crankshaft. Fluid coupling 12 includes an impeller driveably connected to input shaft 10 and a turbine driveably connected to turbine shaft 14. Power is transmitted from the impeller to the turbine via moving fluid whenever the impeller rotates faster than the turbine. Fluid coupling 12 may be a torque converter which also includes a stator which redirects the fluid when the impeller is rotating substantially faster than the impeller such that the turbine torque is a multiple of the impeller torque. Gearbox 16 includes gearing and shift elements configured to establish various power flow paths between turbine shaft 14 and output 18. Output 18 is driveably connected to vehicle drive wheels, preferably via a differential that permits slight speed differences as the vehicle turns a corner. Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The shift elements within gearbox 16 are engaged by supplying hydraulic fluid at an elevated pressure to a clutch apply chamber. Each shift element may include a clutch pack having friction plates splined to one component interleaved with separator plates splined to a different component. The fluid forces a piston to squeeze the clutch pack such that frictional force between the friction plates and the separator plates couples the components. The torque capacity of each shift element varies in proportion to changes in the fluid pressure. Pump 20, driven by input shaft 10, draws fluid from sump 22 and delivers it at an elevated pressure, called line pressure, to valve body 24. In some transmission hydraulic control systems, there may be multiple hydraulic circuits that convey pressurized fluid from the pump to other circuits. For example, some transmissions may have a separate hydraulic circuit that also conveys fluid from an electric pump or accumulator to a subset of the other circuits when the engine is not operating to drive the primary pump. In this document, any circuit that conveys fluid at a regulated input pressure from a primary pressure source is called a line pressure circuit. Valve body 24 delivers the fluid to the clutch apply chambers at a pressure controlled in accordance with signals from powertrain controller 26. Powertrain controller 26 utilizes several input signals including signals from an accelerator pedal 28, a brake pedal 30, and a shifter 32. Shifter 32 permits the driver to select among at least Park, Reverse, Neutral, and Drive modes of operation. In addition to the fluid provided to clutch apply chambers, valve body provides fluid for lubrication and provides fluid to torque converter 12. The fluid eventually drains from gearbox 18 back to sump 22 at ambient pressure.

Figure 2:
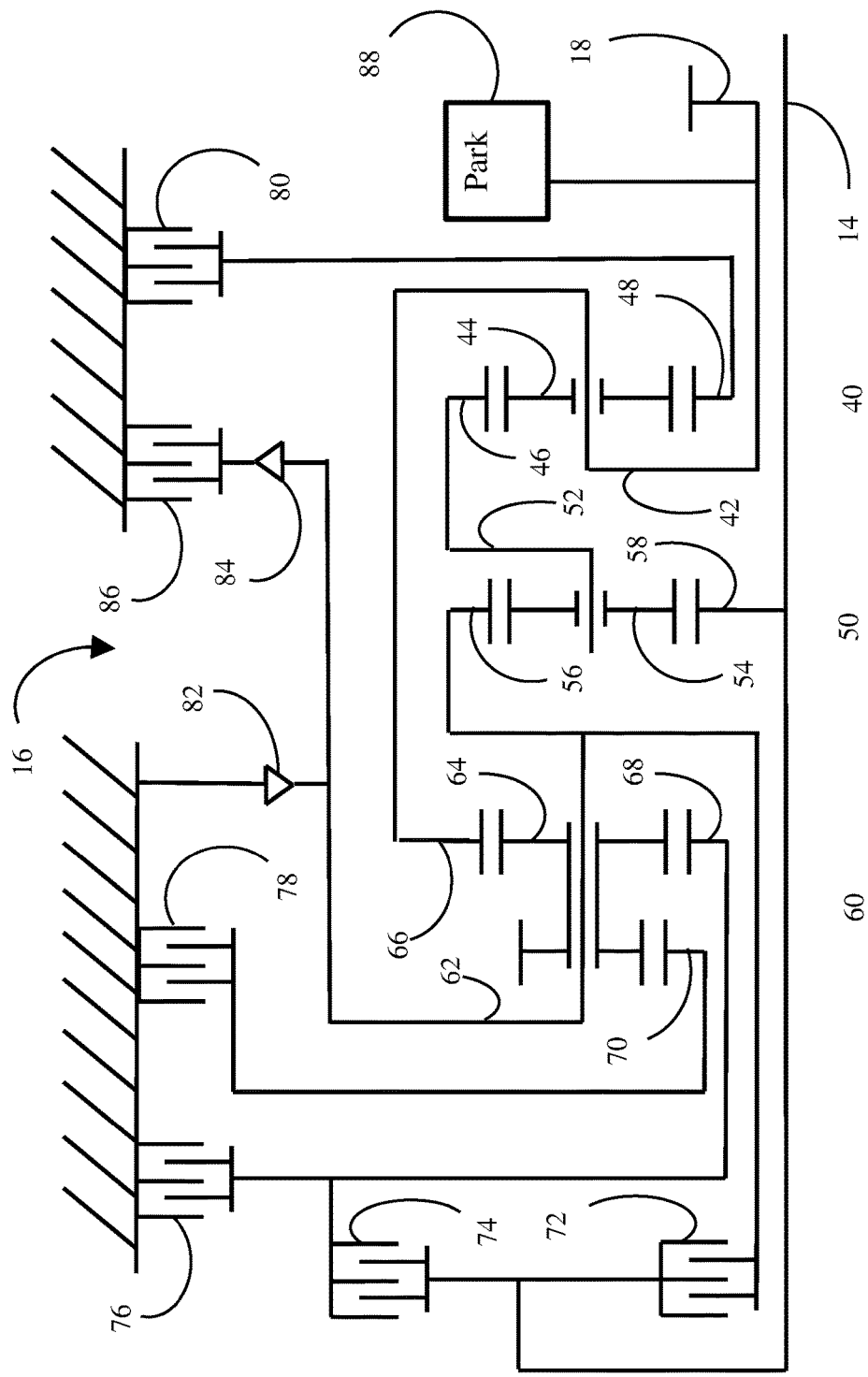
FIG. 2 is a schematic diagram of a transmission gearing arrangement suitable for the gearbox of the transmission system of FIG. 1.

An example transmission is schematically illustrated in FIG. 2. The transmission utilizes two simple planetary gear sets 40 and 50 and one stepped pinion gear set 60. Simple planetary gear set 40 includes a carrier 42 that supports several planet gears 44. Planet gears 44 mesh with ring gear 46 and sun gear 48. Simple planetary gear set 50 includes a carrier 52 that supports several planet gears 54. Planet gears 54 mesh with ring gear 56 and sun gear 58. Stepped pinion gear set 60 includes a carrier 62 that supports several stepped planet gears 64. One set of gear teeth of each stepped planet gear 64 meshes with ring gear 66 and sun gear 68. A second set of gear teeth of each stepped planet gear 64 meshes with sun gear 70.

Sun gear 58 is fixedly coupled to turbine shaft 14. Carrier 42 and ring gear 66 are fixedly coupled to output 18. Carrier 52 is fixedly coupled to ring gear 46. Carrier 62 and ring gear 56 are fixedly coupled to one another and selectively coupled to turbine shaft 14 by clutch 72. Sun gear 68 is selectively coupled to turbine shaft 14 by clutch 74 and selectively held against rotation by brake 76. Sun gear 70 is selectively held against rotation by brake 78. Sun gear 48 is selectively held against rotation by brake 80. One way clutch 82 passively holds carrier 62 against rotation in one direction. One way clutch 84 holds carrier 62 against rotation in the other direction when brake 86 is engaged. One way clutches 82 and 84 and brake 86 may be implemented as a selectable one way clutch that prevents rotation in one direction at all times and prevents rotation in the other direction only when activated.

A suggested ratio of pitch diameters for each planetary gear set is listed in Table 1.

TABLE 1

| | |
|---|---|
| Ring 46/Sun 48 | 2.24 |
| Ring 56/Sun 58 | 2.24 |
| Ring 66/Sun 68 | 2.96 |
| Ring 66/Sun 70 | 1.61 |

As shown in Table 2, engaging the clutches and brakes in combinations of two establishes eight forward speed ratios and one reverse speed ratio between turbine shaft 14 and output 18. An X indicates that the clutch is required to establish the speed ratio. When the gear sets have tooth numbers as indicated in Table 1, the speed ratios have the values indicated in Table 2.

TABLE 2

| | 72 | 74 | 76 | 78 | 80 | 82/84/86 | Ratio | Step |
|---|---|---|---|---|---|---|---|---|
| Rev | | X | | | | X | −2.96 | |
| 1st | | | | | X | X | 4.69 | |
| 2nd | | | | X | X | | 3.30 | 1.42 |
| 3rd | | | X | | X | | 3.01 | 1.10 |
| 4th | | X | | | X | | 1.92 | 1.57 |
| 5th | X | | | | X | | 1.45 | 1.33 |
| 6th | X | X | | | | | 1.00 | 1.45 |
| 7th | X | | X | | | | 0.75 | 1.34 |
| 8th | X | | | X | | | 0.62 | 1.21 |

Park mechanism 88 selectively couples output 18 to the transmission case to prevent vehicle movement when the vehicle is parked. Park mechanism 88 is designed to remain engaged without any external power once engaged.

Figure 3:
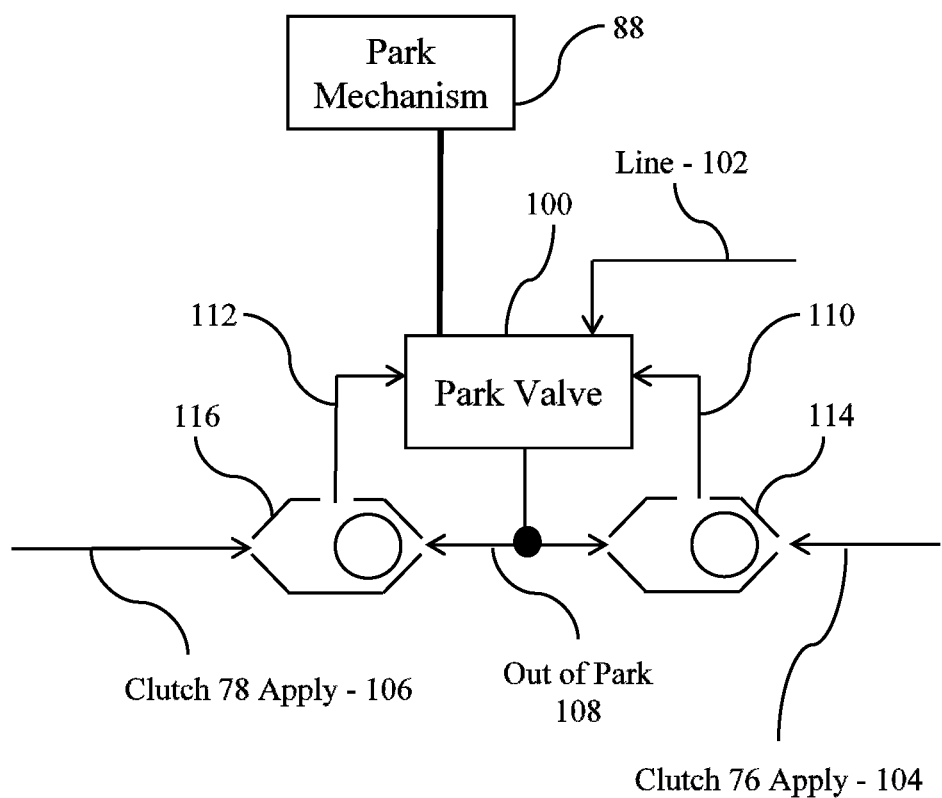
FIG. 3 is a schematic diagram of a park subsystem of a hydraulic control system of the transmission of FIG. 1.

FIG. 3 schematically illustrates the park control subsystem of a hydraulic control system. A spool of park valve 100 is mechanically linked to the park mechanism 88, such that movement in one direction engages the park mechanism and movement in the opposite direction disengages the park mechanism. A spring within the park mechanism biases the system toward engagement. The hydraulic control system includes a line pressure circuit 102 that supplies pressurized fluid to other hydraulic circuits in hydraulic control system. The pressure of fluid in the line pressure circuit 102 is controlled using a regulator valve and, in some cases, by controlling the pump displacement. Line pressure biases the park valve toward the park position. The hydraulic control system also includes a set of clutch apply circuits that are routed to apply chamber of each hydraulically controlled shift elements. The pressures of fluid in the clutch apply circuits are controlled to levels between zero and the pressure in the line pressure circuit 102. These clutch apply circuits include circuits 104 and 106 that engage shift elements 76 and 78 respectively. Park valve 100 fluidly connects an out-of-park circuit 108 to the line pressure circuit 102 when park is disengaged and vents out-of-park circuit 108 when park is engaged. Hydraulic circuits 110 and 112 bias the park valve toward the disengaged position. Check valve 114 fluidly connects circuit 110 to either clutch 76 apply circuit 104 or out-of-park circuit 108, whichever has the higher pressure. Similarly, check valve 116 fluidly connects circuit 112 to either clutch 78 apply circuit 106 or out-of-park circuit 108, whichever has the higher pressure.

When the park mechanism is engaged, both the park mechanism itself and line pressure tend to hold park valve 100 in the engaged position. To disengage the park mechanism, brakes 76 and 78 are engaged by commanding pressure equal to line pressure to apply circuits 104 and 106. Check valves 114 and 116 fluidly connect these clutch apply circuits to circuits 110 and 112 respectively. Pressure in circuits 110 and 112 force the park valve into the disengaged position. Once in the disengaged position, park valve 100 fluidly connects out-of-park circuit 108 to line pressure circuit 102. As a result, the park valve tends to stay in the disengaged position even if brakes 76 and 78 are released. To re-engage the park mechanism, the pressure in line pressure circuit 102 is reduced to a level at which the park mechanism spring forces the park valve to the engaged position.

Using shift elements to disengage the park mechanism adds steps to the process of transitioning from Park to either Drive or Reverse. If the time required to make this transition is excessive, drivers will be dis-satisfied. Therefore, it is advantageous to minimize the time between movement of the shift lever and disengagement of the parking mechanism.

Figure 4:
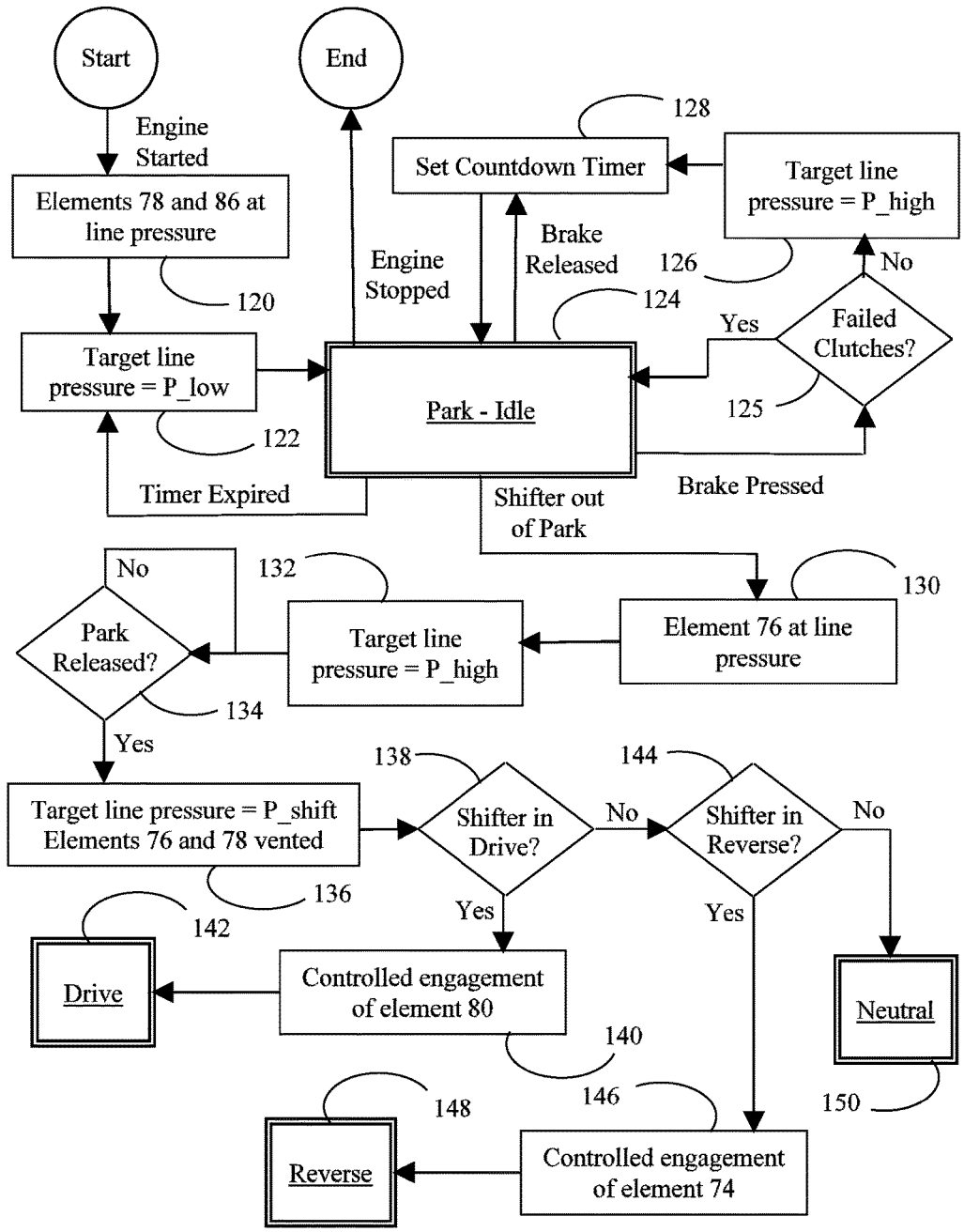
FIG. 4 is a flowchart for operating the transmission of FIG. 1.

A method of controlling the transmission of FIGS. 1-3 is illustrated by the flowchart of FIG. 4. The method is initiated in response to starting the engine while the shifter is in Park. In preparation for disengagement from Park, the controller may command engagement of brakes 78 and 86 at 120. Since brakes 76 and 78 must both be engaged when it is time to release the parking mechanism, engaging one of them in advance reduces the time required once the driver moves the shifter out of the Park position. Brake 86 will need to be engaged if the shifter is moved to Reverse and may be engaged if the shifter is moved to Drive or Neutral, so engaging it in advance potentially reduces the number of steps that must be completed after the shifter is moved. If a selectable one way clutch is utilized, it is important to ensure that carrier 62 is stationary when the selectable one way clutch is engaged. Engagement of brake 78 and the park mechanism ensures that carrier 62 is stationary. Engaging only brakes 78 and 86 doesn't restrain the speed of turbine shaft 14. Allowing turbine shaft 14 to rotate at the same speed as the engine reduces the engine torque and fuel consumption. At 122, controller 26 commands a relatively low line pressure to minimize the torque required to drive the pump. The torque required to drive the pump during idle can significantly influence fuel economy. The controller enters state 124 while waiting for the driver to shift out of Park.

An interlock mechanism prevents the driver from shifting out of Park until the brake pedal is pressed. Typically, drivers do not press the brake pedal until they intend to shift from Park. Therefore, depression of the brake pedal while in Park is a strong indication that the driver will soon be shifting from Park, but is not a guarantee. Releasing the Park mechanism will require both engaging clutch 76 and increasing the line pressure. In anticipation of an imminent shift from Park, controller 26 increases the line pressure in response to depression of the brake pedal at 126. Increasing the line pressure does not cause release of the parking mechanism in this situation because brake 76 is not yet commanded to engage. Although fuel consumption rises due to the increased line pressure, it is only increased for a short duration. A countdown timer is started at 128 for approximately 10 seconds. If the timer expires before the driver moves the shifter out of Park, the line pressure is returned to the low level associated with idle in Park. If the controller is operating in a failure mitigation mode due to detection of a failed clutch, then the controller may return to state 124 at 125 without increasing the line pressure. In the presence of a failed clutch, particularly if failed in the engaged state, increased line pressure could place the transmission in a less safe condition. If the brake pedal is released, the controller sets the countdown timer at 128, for approximately 1-2 seconds. In this way, if the brake pedal is depressed and then quickly released, the target line pressure is increased for a shorter time. In an alternative embodiment, control may instead proceed directly to 122 in response to a brake release event.

In response to movement of the shifter out of Park, controller 26 commands engagement of brake 76 at 130. If the line pressure had been returned to the low level, it is again increased at 132. After a clutch apply circuit is connected to the line pressure circuit, fluid flows into the clutch apply chamber. The pressure in the clutch apply circuit may not increase to the level of the commanded line pressure until the clutch piston is stroked. In fact, the pressure in the line pressure circuit may momentarily drop while the clutch apply chamber is filling. The delay between commanding engagement and the clutch apply pressure increasing is less when the initial line pressure is higher. Once the pressure in circuits 104 and 106 reach a sufficient level, the parking mechanism will release. The controller waits at 134 for the parking mechanism to release. Once parking mechanism release is detected, brakes 76 and 78 are disengaged at 136. Also at 136, the target line pressure is changed to a value suitable for controlled engagement of a drive or reverse ration, which may be less than required to disengage the park mechanism. If the shifter was moved from Park to Drive, as determined at 138, brake 80 is then engaged at 140 to establish the 1st gear power flow path and the controller moves to Drive state 142. If the shifter was moved from Park to Reverse, as determined at 144, clutch 74 is engaged at 146 to establish the reverse gear power flow path and the controller moves to Reverse state 148. Establishing either of these power flow paths involves slowing the turbine shaft 14 to near stationary. Changing the speed of the turbine too rapidly creates an unpleasant sensation for vehicle occupants, so it is important to engage these shift elements in a controlled manner. If the Shifter was moved from Park to Neutral, the controller moves to Neutral state 150.

Alternative embodiments may differ from that described above. In particular, while the embodiment described above releases the park mechanism is response to engagement of two shift elements at elevated pressure, other embodiments may release the park mechanism in response to engagement of only one shift element or in response to more than two shift elements. While the embodiment described above establishes the first gear and reverse gear power flow paths by engaging two shift elements, other embodiments may require fewer than two or more than two shift elements to establish these power flow paths. In the described embodiment, the subset of shift elements required to establish the 1st gear power flow path does not intersect the subset of shift elements used to disengage the park mechanism. Similarly, the subset of shift elements required to establish the reverse gear power flow path does not intersect the subset of shift elements used to disengage the park mechanism. In other embodiments, there may be an intersection of these subsets.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a parking pawl engageable to hold an output shaft stationary;
   a hydraulic control system having a line pressure circuit;
   a pump configured to supply pressurized fluid to the line pressure circuit; and
   a controller configured to increase a pressure in the line pressure circuit in response to depression of a brake pedal while the parking pawl is engaged to decrease a time required to engage a drive ratio.

2. The transmission of claim 1 wherein the hydraulic control system further comprises a plurality of clutch apply circuits and wherein engaging the drive ratio comprises permitting fluid flow from the line pressure circuit to a first subset of the clutch apply circuits.

3. The transmission of claim 2 wherein the hydraulic control system in configured to release the parking pawl in response to fluid pressure in a second subset of the clutch apply circuits.

4. The transmission of claim 1 wherein the controller is further programmed to reduce the pressure in the line pressure circuit if the brake pedal is depressed for longer than a threshold time while a shifter remains in a park position.

5. The transmission of claim 1 wherein the controller is further programmed to reduce the pressure in the line pressure circuit in response to release of the brake pedal.

6. The transmission of claim 1 wherein the controller is further programmed to inhibit the increase in line pressure in response to detection of a clutch failure.

7. A vehicle comprising:
   a parking mechanism configured to selectively hold the vehicle stationary;
   a transmission pump configured to supply pressurized fluid to a line pressure circuit; and
   a controller programmed to increase a pressure in the line pressure circuit in response to depression of a brake pedal while the parking mechanism is engaged to decrease a time required to engage a transmission drive ratio.

8. The vehicle of claim 7 further comprising a plurality of shift elements and wherein engaging the transmission drive ratio comprises engaging a first subset of the shift elements.

9. The vehicle of claim 8 wherein engaging the transmission drive ratio further comprises engaging a second subset of the shift elements to release the parking mechanism.

10. The vehicle of claim 7 wherein the controller is further programmed to reduce the pressure in the line pressure circuit if the brake pedal is depressed for longer than a threshold time while a shifter remains in a park position.

11. The vehicle of claim 7 wherein the controller is programmed to reduce the pressure in the line pressure circuit in response to release of the brake pedal.

12. The transmission of claim 7 wherein the controller is further programmed to inhibit the increase in line pressure in response to detection of a clutch failure.

13. A method of controlling a transmission comprising:
   with the transmission in Park and a brake pedal released, controlling a pressure in a line pressure circuit to a first pressure level; and
   in response to depression of the brake pedal with the transmission in Park, increasing the pressure in the line pressure circuit to a second pressure level.

14. The method of claim 13 further comprising:
   in response to the brake pedal being depressed for a threshold time with the transmission in Park, decreasing the pressure in the line pressure circuit to the first pressure level.

15. The method of claim 13 further comprising:
   in response to a shifter being moved from a Park position, engaging a first shift element to release a parking pawl in the transmission.

16. The method of claim 15 further comprising:
   after the parking pawl is released, engaging a second shift element to establish a power flow path between a transmission input shaft and a transmission output shaft.

17. The method of claim 16 further comprising:
   after the parking pawl is released and before engaging the second shift element, decreasing the line pressure and releasing at least one shift element.

18. The method of claim 17 wherein the at least one shift element includes the first shift element.

* * * * *